United States Patent [19]

Barkalow et al.

[11] Patent Number: 5,716,652
[45] Date of Patent: Feb. 10, 1998

[54] COATED CHEWING GUM PRODUCTS AND METHODS OF MANUFACTURING SAME

[75] Inventors: David G. Barkalow, Deerfield, Ill.; Michael A. Reed, Merrilville, Ind.; Julius W. Zuehlke, Chicago, Ill.; Michael J. Greenberg, Northbrook, Ill.; Gulcin Yilmazer, Chicago, Ill.; Gordon N. McGrew, Evanston, Ill.; Robert J. Yatka, Orland Park, Ill.

[73] Assignee: Wm. Wrigley Jr. Company, Chicago, Ill.

[21] Appl. No.: 720,709

[22] Filed: Oct. 2, 1996

[51] Int. Cl.⁶ ..................................................... A23G 3/30
[52] U.S. Cl. ........................................ 426/5; 426/6
[58] Field of Search ................................. 426/3, 5, 6

[56] References Cited

U.S. PATENT DOCUMENTS

| | | | |
|---|---|---|---|
| 4,828,845 | 5/1989 | Zamudio-Tena et al. | 426/5 |
| 5,248,508 | 9/1993 | Reed et al. | 426/5 |
| 5,270,061 | 12/1993 | Reed et al. | 426/5 |
| 5,376,389 | 12/1994 | Reed et al. | 426/5 |
| 5,409,715 | 4/1995 | Meyers | 426/5 |
| 5,536,511 | 7/1996 | Yatka | 426/5 |
| 5,603,970 | 2/1997 | Tyrpin et al. | 426/5 |

FOREIGN PATENT DOCUMENTS

WO 95/07622  3/1995  WIPO.
WO 95/07625  3/1995  WIPO.

Primary Examiner—Arthur L. Corbin
Attorney, Agent, or Firm—Hill, Steadman & Simpson

[57] ABSTRACT

A confectionary or chewing gum product comprising a center including a water soluble portion. A first coating that comprises a blend of xylitol/mannitol that substantially encloses the center. A second coating that consists essentially of one polyol that substantially encloses the first coating.

13 Claims, 3 Drawing Sheets

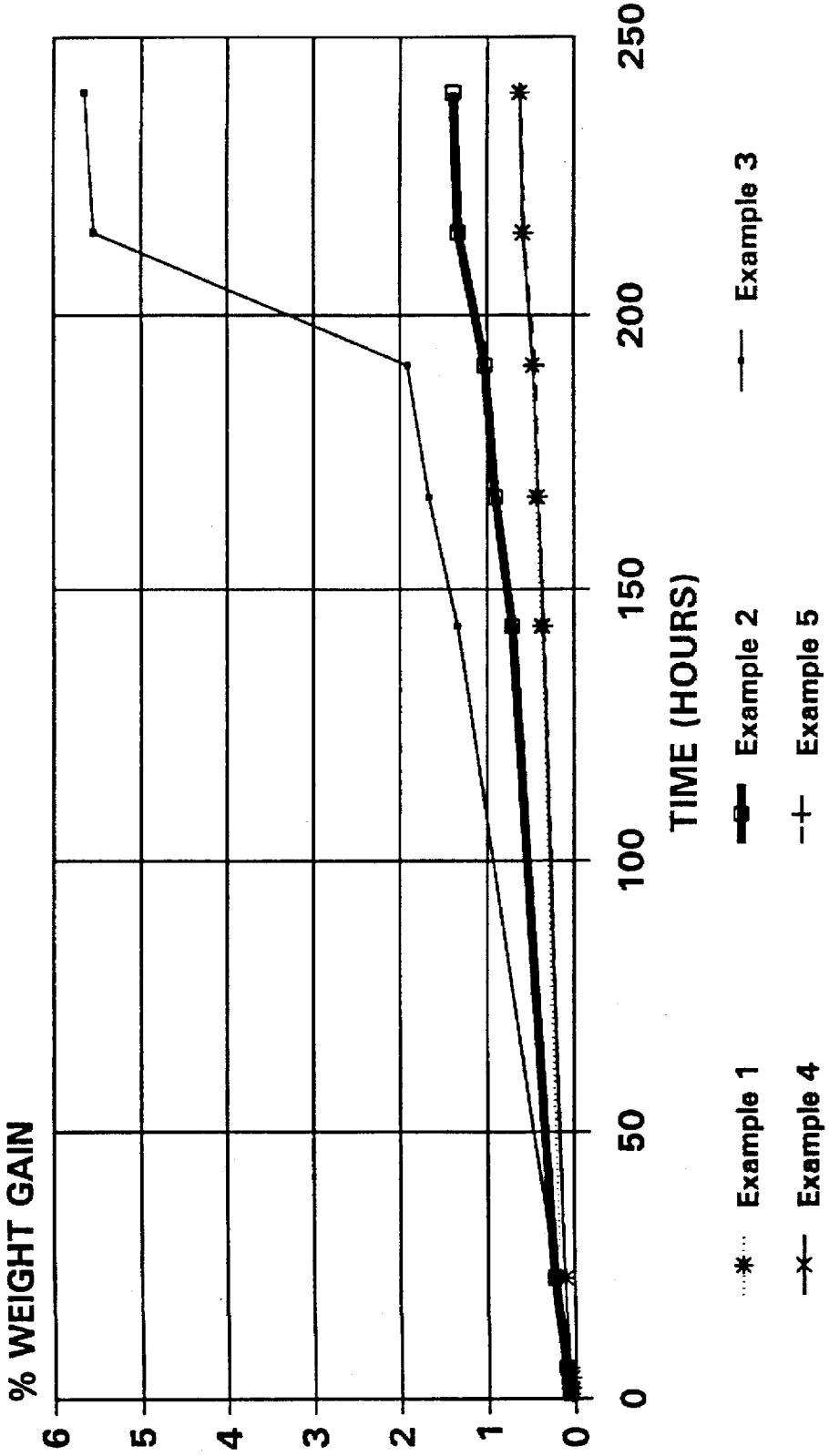

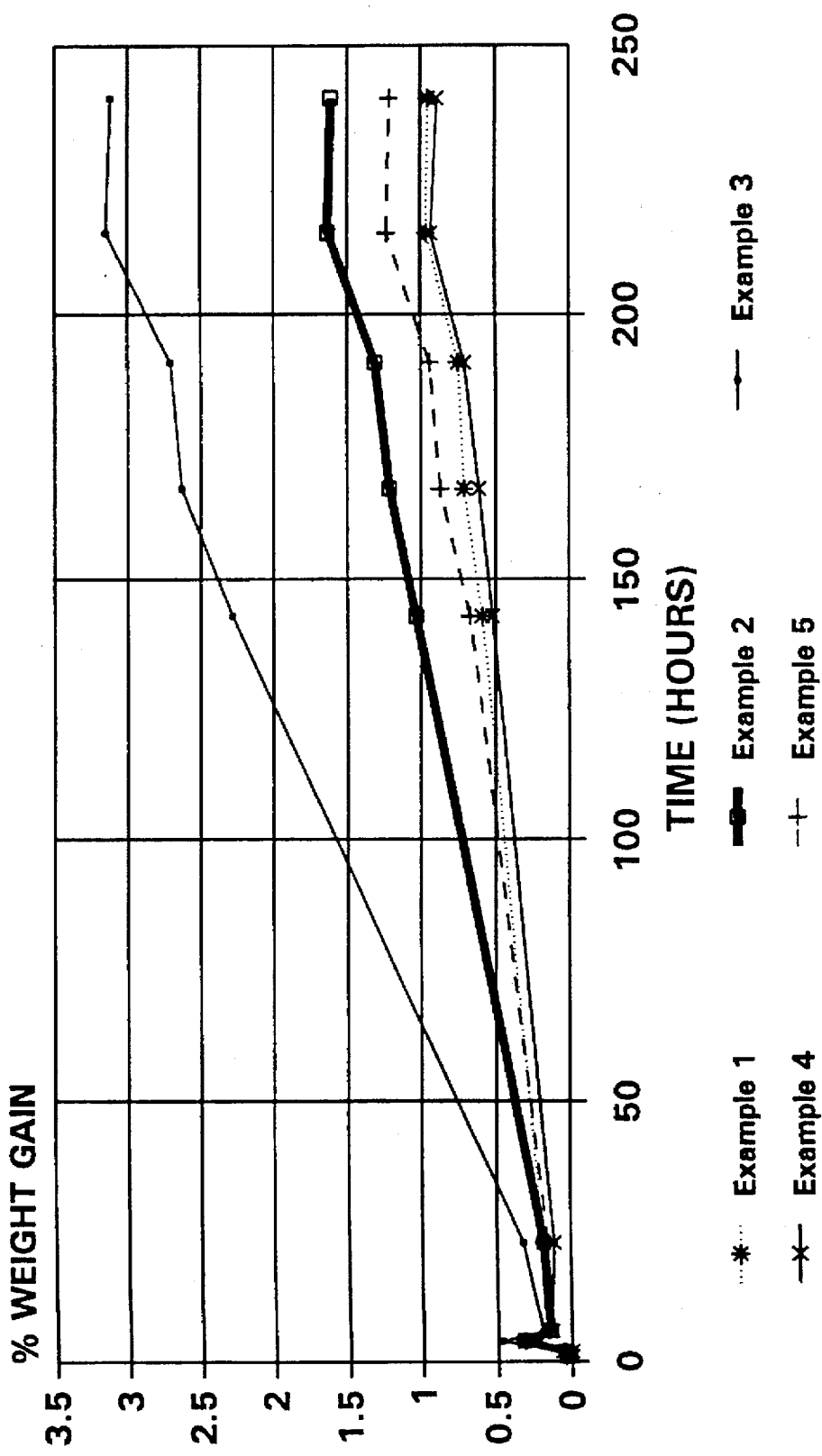

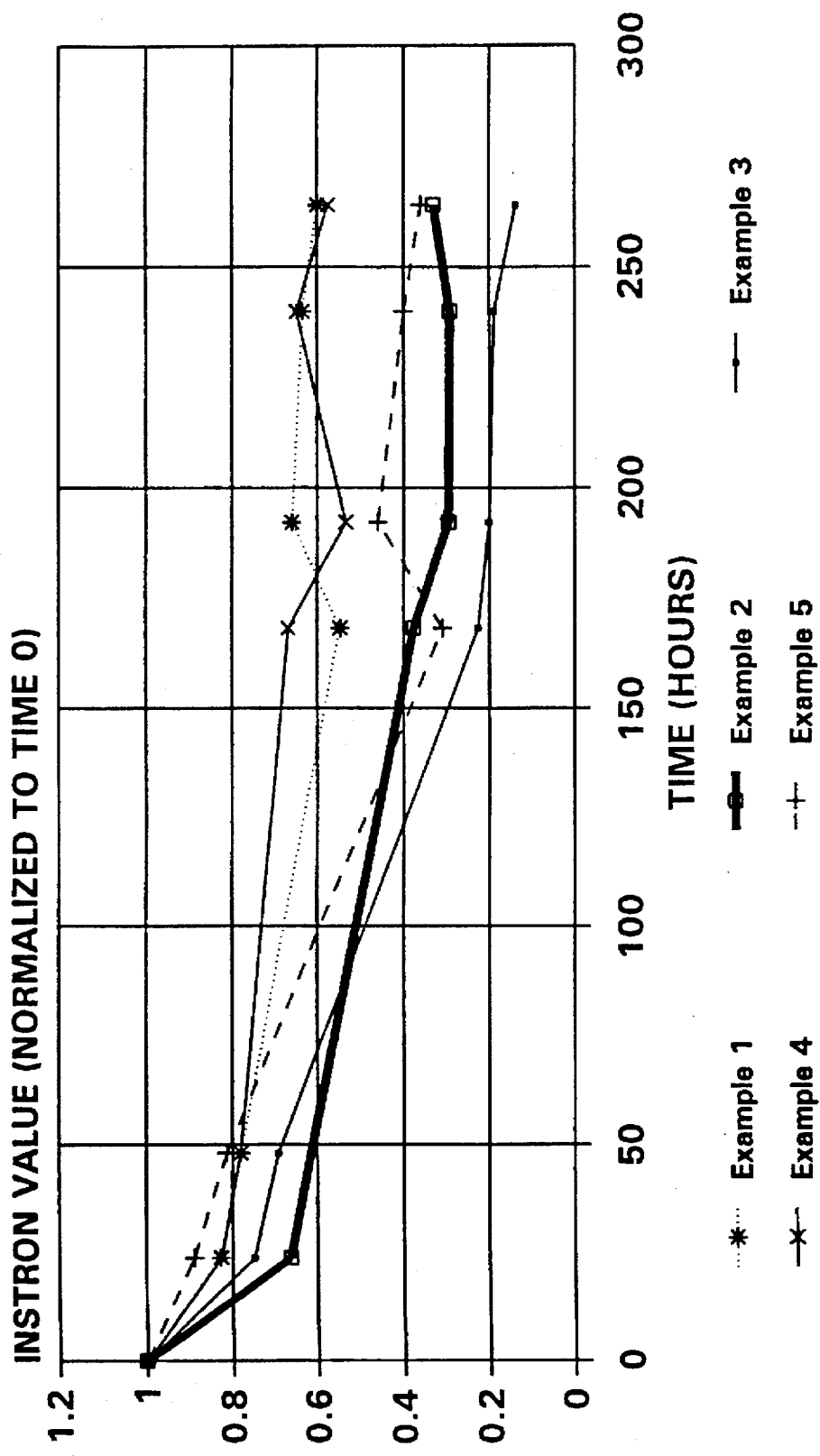

COATED CHEWING GUM PRODUCTS AND METHODS OF MANUFACTURING SAME

BACKGROUND OF THE INVENTION

The present invention relates generally to confectionary products. More specifically the present invention relates to confectionary products that have an outer coating and syrups for creating such outer coatings.

It is of course known to provide a variety of types of confectionary products for consumers. One such confectionary product is chewing gum. Chewing gum generally consists of a water insoluble portion and a water soluble portion including sweeteners.

In a similar vein it is known to provide a variety of different types of chewing gum. For example, it is also known in creating chewing gum, and other confectionary products, to coat the chewing gum with an outer or overcoating. The overcoating can provide an initial sweetness or other desirable oleptic property to the consumer. Further, the overcoating can provide a crunching sensation when chewed by the consumer. The overcoating provides, preferably, a smooth outer appearance to the consumer. A number of such chewing gum products are known.

Initially in creating overcoated chewing gums, sugar syrups were used to create the overcoating. The sugar syrup creates a product having a smooth appearance. When chewed by the consumer the sugar coating provides a crunching sensation to the consumer. Additionally such a coating provides an initial burst of sweetness.

In recent years, efforts have been devoted to replacing sugar and sugar syrups in chewing gum with other carbohydrates and non-carbohydrates. This has entailed not only replacing the sugar sweetener within the chewing gum but the coating layers for coating the chewing gums and other confectionary products. To this end xylitol has been used as an overcoating.

Although xylitol syrups can be used to coat chewing gum they do not provide the same characteristics as sugar syrups. For example, when overcoating of xylitol it is difficult to provide the same appearance as sugar; the overcoating of xylitol is often not as smooth. In fact, xylitol syrup overcoatings become brittle and chip or break, e.g. at the corners of rectangular shaped chewing gum.

Further, xylitol syrups do not immediately crystallize when coated onto the chewing gum. Therefore, the coating process can be more time consuming and accordingly more expensive than the use of sugar syrup coatings. This is especially true if an effort is made to match the appearance of sugar coated products. Still further, a xylitol coating may not provide the crunch that a sugar syrup coating does. "Crunchiness" of the coating is one of the desirable characteristics consumers look to in coated chewing gum products.

One effort to improve upon xylitol coatings is set forth in European Patent Application 95400199.6. Layers or coatings on chewing gum are also disclosed in U.S. Pat. Nos. 5,270,061; 5,376,389; 5,248,508; and 5,409,715 as well as WO 95-07622 and WO 95-07625.

With respect to European application 95400199.6 this application discloses a process wherein a syrup comprising a blend of mannitol and xylitol is used to coat the chewing gum. This mixture has been found to provide an improved appearance on coated chewing gum as compared to xylitol. Further, as compared to xylitol this mixture is easier to coat on to chewing gum at a lower cost.

However, the inventors of the present invention have surprisingly found that the mannitol/xylitol syrup blends, although they provide the necessary "crunchiness" as well as a smooth appearance, are very hygroscopic. Indeed, such blends are much more hygroscopic then the pure xylitol syrups they replace. This results in a product having a decreased shelf life and/or increased packaging costs. It has been found that if not protected from high humidity, xylitol/mannitol coated chewing gum pellets suffer a loss of crunch and hardness, and develop a degraded appearance. In fact when exposed to high humidity the coating can even dissolve and run off the pellet.

There is therefore a need for an improved overcoating.

SUMMARY OF THE INVENTION

The present invention provides an improved overcoating for confectionary products, improved overcoated confectionary products, and improved methods of manufacturing same.

To this end, in an embodiment, the present invention provides a confectionary product comprising a center including a water soluble portion. A first coating comprising a blend of at least two polyols that substantially enclose the center. A second coating comprising essentially only one polyol that substantially encloses the first coating.

In an embodiment, the first coating includes xylitol.

In an embodiment, the first coating includes xylitol and mannitol.

In an embodiment, the second coating is xylitol.

In an embodiment, the second coating is maltitol.

In an embodiment, the product has a substantially rectangular shape.

In an embodiment, the product has a substantially pellet-like shape.

In an embodiment, the polyols are chosen from the group consisting of: xylitol; mannitol; erythritol; lactitol; maltitol; and palatinit.

In an embodiment the second coating comprises 5 to about 50 percent by weight of the total coating.

In another embodiment, the present invention provides a chewing gum product comprising a center including a water soluble portion and a water insoluble portion. A first coating substantially encloses the center. The first coating comprises a blend of at least xylitol/mannitol. A second coating substantially encloses the first coating. The second coating comprises essentially only one polyol and may or may not contain non alditol ingredients.

In still another embodiment, a chewing gum is provided comprising a center including a water soluble and a water insoluble portion. A first coating substantially surrounds the center and includes a xylitol/mannitol blend. A second coating substantially surrounds the first coating. The second coating comprises essentially one polyol.

In an embodiment, the xylitol/mannitol blend comprises a ratio of 95:5 to 50:50.

In yet another embodiment, a method of manufacturing chewing gum is provided comprising the steps of creating a chewing gum, defining a shape, that includes a water soluble portion and a water insoluble portion; coating the shape with a first coating of a blend of at least two polyols; and coating the first coating with a second coating that comprises essentially a single polyol.

It is an advantage of the present invention to provide an improved overcoating for confectionary products.

Another advantage of the present invention is to provide improved confectionary having an overcoating.

Still further, an advantage of the present invention is to provide an improved method for manufacturing products having an overcoating.

Furthermore, an advantage of the present invention is to provide an improved chewing gum composition.

Moreover, an advantage of the present invention is to provide an overcoating that does not include sugar, but provides the advantages of a sugar syrup overcoating.

Another advantage of the present invention is to provide an overcoating that has improved shelf life as compared to xylitol/mannitol blends.

Further, an advantage of the present invention is to provide an improved method for manufacturing chewing gum having an overcoating.

Still another advantage of the present invention is to provide a chewing gum having an overcoating.

Additional advantages and features of the present invention are described in the detailed description of the presently preferred embodiments and the figures.

BRIEF DESCRIPTION OF THE FIGURES

FIG. 1 illustrates graphically percent weight gain over time at 60% humidity and 85° F. for the examples set forth in the specification.

FIG. 2 illustrates graphically percent weight gain over time at 70% humidity and 85° F. for the examples set forth in the specification.

FIG. 3 illustrates graphically Instron values over time at 70% humidity and 85° F. for the examples set forth in the specification.

DETAILED DESCRIPTION OF THE PRESENTLY PREFERRED EMBODIMENTS

The present invention provides improved overcoated confectionary products as well as methods for overcoating confectionary products. Although, in the preferred embodiments set forth below the confectionary product is chewing gum the present invention is not limited to chewing gum. The present invention can be used to overcoat food stuff most preferably confectionary products. It is also possible to use the overcoating to coat pharmaceutical products.

Generally the present invention comprises the use of a polyol overcoating applied to a product previously coated with blended polyols. Pursuant to the present invention, the use of a second overcoating greatly improves the shelf-life of the product. In this regard the second overcoating protects the more hygroscopic inner coating from humidity.

In addition to longer shelf-life, use of the present invention reduces the need for expensive high-barrier wrapping materials and techniques. Still further, the resultant overcoated product has a very acceptable appearance and provides necessary crunch when consumed.

Pursuant to the present invention a confectionary product, e.g., a chewing gum product, is first overcoated with a blended polyol. This creates a first coating—this first coating is then overcoated with a second coating that comprises essentially a single polyol.

Blended polyol coatings are a new development in the field of confectionary coatings. WO 95-07625 discloses blends of erythritol with xylitol in 5:95 to 95:5 ratios. The possibility of blending erythritol with other polyols is also mentioned. A preferred blended polyol coating is a xylitol/mannitol blend in a ratio of 95:5 to 50:50 as disclosed in EP 95400199.6. These coatings provide improved appearance and processing at lower cost than pure xylitol coatings. The preferred ratio is between 95:5 and 70:30 xylitol:mannitol.

As used herein the term "essentially one polyol" means that these coatings are not a blended polyol coatings- As used herein "blended polyols" comprise two or more polyols. However, both the pure ("essentially one polyol") and blended polyol coatings may include non-polyol ingredients such as binders (e.g. gum arabic), fillers (e.g. talc and calcium carbonate), colors (e.g. titanium dioxide), film formers (e.g. hydroxypropyl methyl cellulose) and other ingredients which are commonly used in sugar and sugarless coatings. The specific ingredients and their usage levels will vary greatly according to the intentions for the formulation.

As noted above, pursuant to the present invention the polyol coatings are coated with a second coating that comprises essentially one polyol. The essentially one polyol overcoating may comprise 5 to 50% of the total coating weight. The precise level will depend on the degree of protection offered by the particular polyol used and the degree of hygroscopicity of the underlying blended polyol coating.

In general, greater hygroscopicity of the polyol blend and less barrier protection of the overcoat polyol will argue for higher levels of overcoating. The preferred level will normally be in the range of 10 to 30% of the total coating. The level used will also be affected by such factors as cost, sensory properties, dental health benefits and production considerations.

In a preferred embodiment the second overcoating comprises xylitol. Xylitol is relatively hygroscopic. However, other polyols can be used for the second overcoating including mannitol, erythritol, lactitol, maltitol and hydrogenated isomaltulose (palatinit). Although possibly less effective as protection against moisture gain than the other polyols, xylitol has desirable dental and sensory properties and is easily applied to a blended xylitol/mannitol first overcoating.

The coatings of the present invention can be applied by conventional coating techniques. In this regard, the confectionary centers to be coated can be tumbled in a horizontally oriented pan or drum while an aqueous solution of the coating material is sprayed onto the tumbling pieces. The spraying is alternately started and stopped to allow layers of coating to dry onto the surface of the pieces. Forced air and dry powder addition may be used to speed the drying process.

Pursuant to the present invention, layers of the underlying blended polyol coating will be followed by layers of the essentially one polyol overcoat. The parameters of the operation (spray time, dry time, air temperature, tumbling speed and others) will vary greatly from one system to another and may well vary within a coating batch and from batch to batch. They will be set based on the skill and experience of the developer and operator.

In addition to the coating applied by spraying the aqueous solution onto the centers, optionally flavors may be separately sprayed onto the pieces during the coating process to provide a flavored coating. If used, this flavor may constitute from about 0.01 to 3% of the total coating with levels of 0.5 to 2% being preferred.

Optionally a final polishing coat may be applied to the pieces after the polyol coatings have been applied. The polishing coat may use a wax, such as carnauba wax, or shellac. It may also include fillers such as talc and colors. The polishing coat is typically 0.1 to 0.5% of the total coating.

Coating equipment usable in the present invention will include any suitable apparatus normally used for this purpose. Simple systems may comprise motor driven pans with manually controlled spray nozzles and drying air. However, more sophisticated automated systems such as Driam and Dumoulin Coaters are preferred.

As noted above, the present invention can be used to create coated chewing gum. A variety of chewing gum formulations can be used. Chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, be weight, of the chewing gum, more commonly, the gum base comprises 10 to about 50 percent of the gum, and in some preferred embodiments, 20 to about 35 percent, be weight, of the chewing gum.

In an embodiment, the chewing gum of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc. Preferably, the salatrim does not comprise more than 40% by weight of the gum base.

Synthetic elastomers may include, but are not limited to, polyisobutylene with a GPC weight average molecular weight of about 10,000 to about 95,000, isobutylene-isoprene copolymer having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing the preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whitenets may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners may, in addition to including caprenin, include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, lactitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

A variety of processes for manufacturing chewing gum are possible.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

By way of example and not limitation examples of the present invention will now be given.

For the following examples chewing gum pellet centers were prepared according to the following formula:

|   | % |
|---|---|
| Sorbitol | 43.14 |
| Base | 33.97 |
| Calcium Carbonate | 13.64 |
| Glycerin | 7.44 |

-continued

|   | % |
|---|---|
| Peppermint Flavor | 1.68 |
| Encapsulated Aspartame | 0.13 |
|   | 100.00 |

Four coating syrups were prepared by dissolving the dry ingredients in 80° to 90° water then evaporating the syrup to the specified Brix. The syrups were then held at 75° to 85° C. until use.

| Syrup: | A 100% Xylitol | B 100% Xylitol | C 90/10 | D 85/15 |
|---|---|---|---|---|
| Xylitol | 67.63 | 73.66 | 61.02 | 57.46 |
| Mannitol |  |  | 6.78 | 10.24 |
| 50% Aqueous Binder Solution | 17.97 | 6.62 | 7.00 | 7.00 |
| Titanium Dioxide | 0.68 | 0.68 | 0.57 | 0.57 |
| Water | 13.72 | 19.04 | 24.63 | 24.73 |
|  | 100.00 | 100.00 | 100.00 | 100.00 |
| Brix | 70–72 | 70–72 | 66–68 | 66–68 |

The following examples include approximate quantities of syrup used. Some of the coating material is inevitably lost in processing. The quantity of coating applied is based on weight gain.

Example 1—Pure Xylitol Coating 60 kg of centers were coated first with 32.9 kg of Syrup A followed by 20.1 kg of Syrup B. During application of the syrups, 154 g of peppermint flavor was ladled onto the pellets. Following application of the polyol coatings, 50 g of a polishing coating consisting of carnauba wax was applied. The final product consisted of approximately 60% center and 40% coating which was 100% xylitol (of total polyols).

Example 2—90/10 Xylitol/Mannitol, No overcoat 60 kg of centers were coated with 53.8 kg of Syrup C. Flavor addition was performed as in Example 1. Approximately 21 kg of product was removed and later polished as in Example 1. The finished product consisted of approximately 61% center and 39% coating which was a 90% xylitol/10% mannitol polyol blend.

Example 3—85/15 Xylitol/Mannitol, No overcoat 60 kg of centers were coated with 32.5 kg of Syrup D. 77g of flavor was ladled into the coating drum during this application. About 2 kg of coated pellets were removed and later polished. The finished product consisted of approximately 67% center and 33% coating which consisted of 85% xylitol and 15% mannitol of total polyols.

Example 4—90/10 Xylitol/mannitol, Overcoated

Approximately 69 kg of coated pellets remained in the coater after Example 2 pellets were removed. These were coated with 4.8 kg of Syrup B and polished as in Example 1. The finished product consisted of approximately 58% center and 42% coating which was 89% base coat (90% xylitol/10% mannitol) and 11% pure xylitol overcoat.

Example 5—85/15 Xylitol/Mannitol Overcoated

Approximately 80 kg of coated pellets remaining in the Coater after Example 3 pellets were removed were further coated with 14.4 kg of Syrup B. 77 g of flavor was ladled in during the coating were process. The pellets were then polished as in Example 1. The finished product was approximately 59% center and 41% coating which was 71% base coat (85% xylitol/15% mannitol) and 29% pure xylitol overcoat.

Testing

Samples of the five coated gums were weighed then stored in humidity cabinets at 85° F./60 and 70% RH for ten days. Periodically, samples were reweighed to determine percent weight gain due to moisture absorption. The results are illustrated graphically in FIGS. 1 and 2.

As can be seen, at 60% RH the overcoated samples (Examples 4 and 5) were equal to the 100% xylitol coated gum (Example 1) while the 90/10 xylitol/mannitol, no overcoat sample (Example 2) was significantly more hygroscopic. The 85/15 xylitol/mannitol, no overcoat product (Example 3) was much more hygroscopic than any of the others.

At 70% RH, the 90/10 xylitol/mannitol overcoated sample (Example 4) was essentially identical to the 100% xylitol control (Example 1). The overcoated 85/15 sample (Example 5) was slightly more hygroscopic, but still lower than the no overcoat 90/10 (Example 2) which, in turn, was lower than the no overcoat 85/15 (Example 3).

Additional samples were stored at 85° F./70% RH for eleven days for Instron testing. The Instron measures the hardness of the shell, a desirable property which correlates with crunchiness. The results of this test are illustrated graphically in FIG. 3.

As can be seen, the 90/10 overcoated sample (Example was comparable to the 100% xylitol control (Example The 85/15 overcoated product (Example 5) was softer than the Control but still generally harder than the 90/10 no overcoat sample (Example 2) and clearly harder than the 85/15 no overcoat sample (Example 3).

Informal sensory testing confirmed the Instron results.

Example 6—85/15 Xylitol/Mannitol Overcoated With Maltitol 60 kg pellet centers used in Examples 1–5 were coated with 31.6 kg of Syrup D. 154 g of flavor was ladled into the drum during this operation. The pellets were then coated with 11.6 kg of a maltitol syrup comprising:

|  | Percent by Weight |
| --- | --- |
| Maltitol | 61.41 |
| 50% Aqueous Binder Solution | 5.16 |
| Titanium Dioxide | 0.36 |
| Water | 33.03 |
| Acesulfame Potassium | 0.04 |
|  | 100.00 |
| Brix | 64.5 |

An additional 1.4 kg of powdered maltitol was added in increments during the first 18% of the overcoating syrup application. This dry charging produced a rough surface which was smoothed out by the later syrup additions. The coated pellets were polished with 50 g of carnauba wax. The final product had a smooth, glossy finish and was composed of approximately 65.5% center and 34.5% coating which was approximately 72% 85/15 xylitol/mannitol undercoat and 28% pure maltitol overcoat.

The Example 6 pellets were judged superior in appearance to those of Example 1 and at purity with Example 5. Sensory evaluation showed purity with Example 1.

Untested Examples

The following samples have not been prepared but are provided to illustrate additional embodiments of the invention.

Example 5 can be repeated, substituting the following syrups for Syrup B.

|  | Percent by Weight | | |
| --- | --- | --- | --- |
| Example | 7 | 8 | 9 |
| Palatinit | 69.4 | — | — |
| Erythritol | — | 67.4 | — |
| Lactitol | — | — | 69.4 |
| Aqueous Binder Solution | 5.0 | 7.0 | 5.0 |
| Titanium Dioxide | 0.6 | 0.6 | 0.6 |
| Water | 25.0 | 25.0 | 25.0 |
|  | 100.00 | 100.00 | 100.00 |

Of course, adjustments in syrup composition and processing parameters can be made as necessary. The use of dry charging (adding dry powder to the wet coating) or suspension syrups may facilitate coating with these polyols.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A chewing gum product comprising:
   a center including a water soluble portion and a water insoluble portion;
   a first coating that substantially encloses the center and comprises a blend of xylitol and mannitol; and
   a second coating that substantially encloses the first coating and consists essentially of one polyol.

2. The chewing gum product of claim 1 wherein the first coating includes only xylitol and mannitol.

3. The chewing gum product of claim 1 wherein the second coating is xylitol.

4. The chewing gum product of claim 1 wherein the second coating is maltitol.

5. The chewing gum product of claim 1 wherein the product has a substantially rectangular shape.

6. The chewing gum product of claim 1 wherein the product has a substantially spherical shape.

7. The chewing gum product of claim 1 wherein the second coating is a polyol chosen from the group consisting of: xylitol; mannitol; erythritol; lactitol; maltitol; and palatinit.

8. The chewing gum product of claim 1 wherein the second coating comprises 5 to about 50 percent by weight of the total coating that encloses the center.

9. A chewing gum comprising:
   a center including a water soluble portion and a water insoluble portion;
   a first coating that substantially surrounds the center and includes a xylitol/mannitol blend; and
   a second coating that surrounds the first coating, the second coating consisting essentially of polyol.

10. The chewing gum of claim 9 wherein the xylitol/mannitol blend is used in a ratio of 95:5 to 50:50.

11. The chewing gum of claim 9 wherein the first and second coatings include non-polyol ingredients.

12. A method of manufacturing chewing gum comprising the steps of:
   creating a chewing gum product having a shape that includes a water soluble portion and a water insoluble portion;

coating the shaped product with a first coating of a xylitol/mannitol blend; and coating the first coating with a second coating that consists essentially of a single polyol.

13. The method of claim 12 wherein the shaped product is coated by use of a tumbling means.

* * * * *